United States Patent [19]
Wakabayashi et al.

[11] 3,751,090
[45] Aug. 7, 1973

[54] VEHICLE FENDER

[76] Inventors: Manzo Wakabayashi, 7-13, 2-chome, Nishirokugo; Toshio Kato, 353, 3-chome, Kashiwagi, both of Tokyo; Michio Kawabe, 2341 Isurumi-cho, Yokohama; Nobumi Kawai, 2-13, 2-chome, Ebis, Tokyo; Minoru Ishida, 66-Shirahata, Urawa, all of Japan

[22] Filed: July 27, 1972

[21] Appl. No.: 275,892

Related U.S. Application Data

[63] Continuation of Ser. No. 146,031, May 24, 1971, abandoned.

[52] U.S. Cl. ................ 293/38, 293/15, 293/50, 293/64
[51] Int. Cl. ..... B60r 19/06, B60r 21/14, B61f 19/06
[58] Field of Search ............... 293/15, 16, 27, 28, 293/29, 38, 39, 40, 41, 42, 43, 45, 46, 50, 60, 64

[56] References Cited
UNITED STATES PATENTS

| | | | |
|---|---|---|---|
| 537,597 | 4/1895 | Astruck | 293/43 X |
| 545,186 | 8/1895 | Andrews | 293/45 |
| 545,908 | 9/1895 | Parmenter | 293/60 |
| 765,067 | 7/1904 | Derx | 293/45 |
| 894,357 | 7/1908 | Wehn | 293/40 |
| 897,658 | 9/1908 | Rebar | 293/41 |
| 1,386,308 | 8/1921 | Bedaux | 293/41 X |
| 1,407,881 | 2/1922 | Nordnes | 293/27 X |
| 1,431,117 | 10/1922 | Israel | 293/60 |
| 1,447,061 | 2/1923 | Bush | 293/41 X |
| 1,488,551 | 4/1924 | Panza | 293/27 |

FOREIGN PATENTS OR APPLICATIONS

| | | | |
|---|---|---|---|
| 259,859 | 10/1926 | Great Britain | 293/38 |
| 368,232 | 2/1939 | Italy | 293/45 |
| 369,275 | 3/1932 | Great Britain | 293/40 |

*Primary Examiner*—Gerald M. Forlenza
*Assistant Examiner*—Howard Beltran
*Attorney*—Joseph F. Brisebois

[57] ABSTRACT

This invention relates to a rescue device adapted to be attached to a car body, and comprising a net stretched over a frame which is foldably and vertically slidably attached to the front of the car body and elastic means for unfolding said net to spread it out in front of the car body.

3 Claims, 7 Drawing Figures

VEHICLE FENDER

This application is a continuation of our copending application Ser. No. 146,031, filed May 24, 1971, now abandoned.

SUMMARY OF THE INVENTION

This invention relates to a rescue device attached to a car body.

The primary object of this invention is to provide a rescue device which can be quickly spread out in front of the car body in an emergency, thereby preventing a person from being thrown up onto the car body or run over by the car.

Another object of this invention is to provide a rescue device comprising a net-stretching frame, which is normally held up and fixed in a bent position so as not to hamper the operation of the car and which is released from this position and falls, when the net is to be spread out, until the bottom of said frame hits the ground, at the same time that said frame is unfolded. The release from the fixed position is effected by two holding means which act simultaneously.

Other objects of this invention will be apparent from a reading of the following description of one embodiment of the invention.

Figure 1:
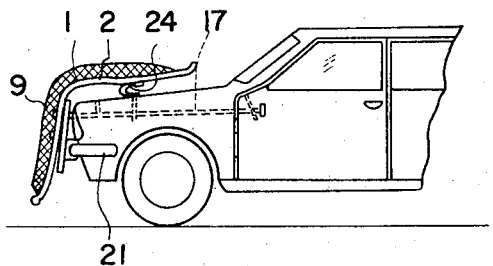
FIG. 1 is a side view of a car with a rescue device according to this invention attached thereto.
Figure 2:
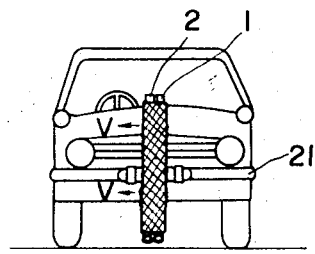
FIG. 2 is a front elevation of the same car.
Figure 3:
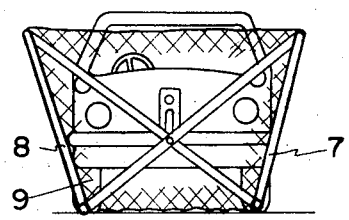
FIG. 3 shows the rescue device according to this invention being unfolded.
Figure 4:
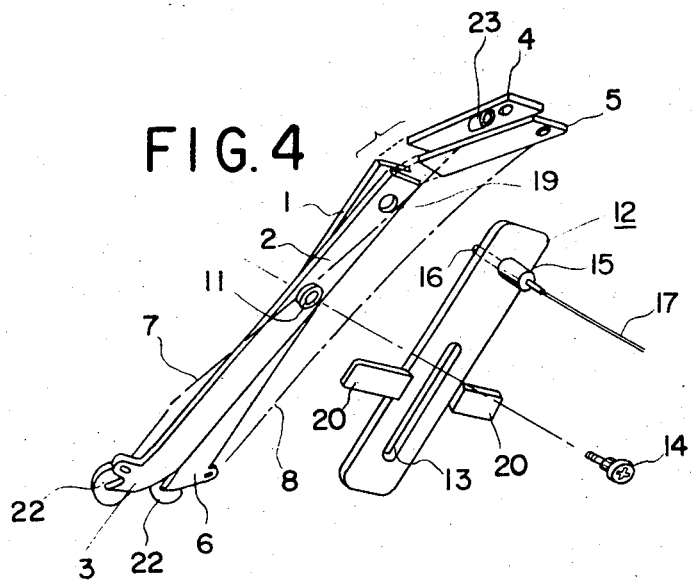
FIG. 4 is a rear oblique view showing the relationship between the frame and its holding means.
Figure 5:
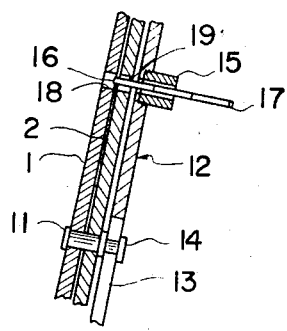
FIG. 5 is an enlarged sectional view taken along the line V—V of FIG. 2.
Figure 6:
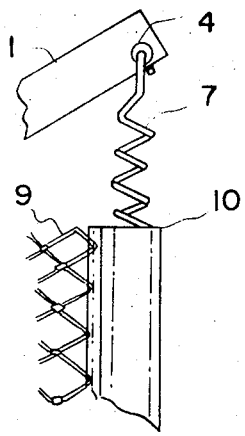
FIG. 6 illustrates the relationship between the frame and the net.
Figure 7:
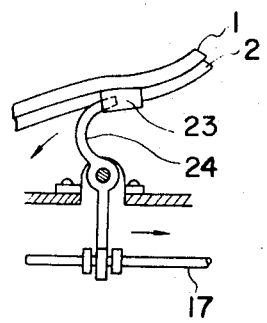
FIG. 7 is a fragmentary view showing the hook holding the frames bent back over the hood.

Referring now to FIGS. 1 – 6, a pair of elastic frames 1, 2 are pivotally connected near the bottom. Between the ends 3 and 4 and between the other ends 5 and 6 of these frames strong elastic means 7, 8 such as coil-springs or rubber bands are stretched, and a net 9 is stretched between said elastic means 7, 8. As indicated in FIG. 6, said elastic means are wrapped in a cylinder 10 of stiff cloth and the net 9 is sewn firmly to this cylinder.

It is desirable to use a highly elastic material for the net 9. A weight 22 is attached to the lower end of the frames. The pivot 11 of the frames 1, 2 is provided by a bolt 14 vertically slidable in the longitudinal slot 13 of the support member 12 which is fixed to some part of the car body, as for example, the bumper. A hollow bolt 15 is mounted at the top of the support member 12 and a stop pin 15 is seated in and projects forwardly from this bolt. The stop pin is connected by a wire 17 to the seat in the car. The frames 1, 2 have holes 18, 19, which register with each other when the frame members are brought closer to each other against the resistance of elastic means. When these holes 18, 19 come to a position opposite to the pin 16 in the support member 12, the stop pin 16 is inserted into these holes 18, 19 and, as shown in FIG. 5, the frames are then held in a contracted state by the pin 16. This state corresponds to the position in which the pivot of the frames comes to its uppermost position in the slot in the support member 12.

The support member 12 is attached by tying its protruding arms 20, 20 to the bumper 21 with a wire or the like. The frames thus mounted are bent back over the hood by virtue of their elasticity and are kept bent by engaging the upper end of a hook 24, pivotally attached to the hood, in the ring 23 attached to one of the frames. The bottom end of the hook 24 is attached to the wire 17. When the wire 17 is pulled toward the seat, the hook is tilted forward, thereby disengaging the ring 23 and at the same time withdrawing the pin 16.

In order to keep the net in position when the frames are folded up, it is advisable to wrap the frames in a bag made of a waterproof material which tears easily, such as a thin sheet of polystyrene.

While in actual practice only ordinary passenger cars have been equipped with the device according to the invention, it goes without saying that the device is applicable to other types of vehicles, such as buses, trucks.

If a pedestrian suddenly appears in the path of a car, the driver pulls the wire 17. Then, the hook is disengaged from the ring and at the same time the stop pin drops out of the holes of the frames. Then the frames, being unfolded by the action of the elastic means, fall down and the net is spread out in front of the car. A pedestrian lying on the road will be prevented from being run over by the car.

If he is standing, he will be elastically received on the hood of the car by means of the frames. As he is caught by the net, he may be able to grip the net so that the possibility of his being thrown off the hood to his death will be minimized.

What is claimed is:

1. A rescue device for attachment to a car body, comprising:
   a. mounting means adapted to be attached to the bumper in front of the car body and having a vertical slot;
   b. a pair of elastic frames pivotally attached to each other by pivot means slidably mounted in the slot in said mounting means;
   c. first elastic means stretched between one end of one frame and one end of the other frame and second elastic means stretched between the remaining ends of said frames;
   d. a net stretched between said elastic means;
   e. means for holding said frames together; and
   f. means for releasing said holding means.

2. A rescue device as claimed in claim 1, which also comprises second holding means for holding the upper end of said frames in a bent position with said pivot means near the top of said slot, and means for releasing said second holding means from its holding position.

3. A rescue device for attachment to an automobile having a front bumper, said device comprising:
   a. mounting means adapted to be attached to said front bumper;
   b. a pair of elastic frames pivotally attached to each other by pivot means mounted in said mounting means;
   c. first elastic means stretched between one end of one frame and one end of the other frame and second elastic means stretched between the remaining ends of said frames;
   d. a net stretched between said elastic means;
   e. means for holding said frames together; and
   f. means for releasing said holding means.

* * * * *